US011600235B1

United States Patent
Choi et al.

(10) Patent No.: US 11,600,235 B1
(45) Date of Patent: Mar. 7, 2023

(54) SCHEME FOR OPERATING UNDER-DISPLAY CAMERA TO PREVENT LIGHT INTERFERENCE FROM DISPLAY

(71) Applicant: Meta Platforms Technologies, LLC, Menlo Park, CA (US)

(72) Inventors: Min Hyuk Choi, San Jose, CA (US); Zhiming Zhuang, Sammamish, WA (US); Dong Chen, Foster City, CA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 17/556,810

(22) Filed: Dec. 20, 2021

(51) Int. Cl.
*G09G 3/34* (2006.01)
*H04N 5/225* (2006.01)
*H04N 5/235* (2006.01)

(52) U.S. Cl.
CPC ......... *G09G 3/3406* (2013.01); *H04N 5/2257* (2013.01); *H04N 5/2351* (2013.01); *H04N 5/2354* (2013.01); *G09G 2310/08* (2013.01); *G09G 2360/144* (2013.01)

(58) Field of Classification Search
CPC ............ G09G 3/3406; G09G 2310/08; G09G 2360/144; H04N 5/2257; H04N 5/2351; H04N 5/2354
See application file for complete search history.

(56) References Cited

U.S. PATENT DOCUMENTS

| 8,223,188 | B2 * | 7/2012 | Ryf | H04N 7/144 348/14.08 |
| 8,576,325 | B2 * | 11/2013 | Dudek | H04N 7/144 348/344 |
| 2009/0009628 | A1 * | 1/2009 | Janicek | H04N 7/144 348/333.01 |
| 2011/0279689 | A1 * | 11/2011 | Maglaque | H04N 5/2253 348/333.01 |
| 2022/0116519 | A1 * | 4/2022 | Nikhara | G06F 1/1686 |

* cited by examiner

*Primary Examiner* — Luong T Nguyen
(74) *Attorney, Agent, or Firm* — Fenwick & West LLP

(57) ABSTRACT

Embodiments relate to coordinating operation of an under-display camera and a portion of a display panel over the camera to reduce impact of light emitted from the display panel during light sensing periods of the under-display camera. Depending on the level of light in the surrounding of an electronic device, the light emission period of the display panel and the light sensing period of the under-display camera are adjusted. The timing of the light emission period and the light sensing period are controlled so that a row of pixels in the display panel is not in the light emission period when corresponding row or rows of sensors in the under-display camera are in the light sensing period. In this way, the under-display camera may capture images without the influence of light emitted from the display panel.

20 Claims, 6 Drawing Sheets

SCHEME FOR OPERATING UNDER-DISPLAY CAMERA TO PREVENT LIGHT INTERFERENCE FROM DISPLAY

BACKGROUND

This disclosure relates to an operating scheme for an under-display camera and a display panel over the under-display camera.

In an electronic device of a smaller size, more of its top or front surface are being occupied by a display panel. As attempts are made to increase the display area on the electronic device, an under-display camera is being adopted for placement under the display panel. Such under-display camera does not occupy separate space in the top or front surface of the electronic device. Hence, the under-display camera enables more of the front or top surface to be devoted to the display panel. A portion of the display panel that overlaps with the under-display panel is made transparent, and therefore, it lets external light through to the under-display camera. However, the portion of the display panel is generally turned off during the sensing operation of the under-display camera so that the light emitted from the portion of the display panel does not impact the performance of the under-display camera. That is, when the under-display camera and the portion of display panel are operated simultaneously, the light emitted from pixels of the display panel may reflect back into the under-display camera, deteriorating the quality of image captured by the under-display camera.

SUMMARY

Embodiments relate to operating an under-display camera of an electronic device simultaneously with a portion of a display panel above the under-display camera. For each row of a display panel, a display frame includes a light emission period and a non-light emission period. The light emission period for the portion of the display panel over the under-display camera is determined. A row of pixels in the portion of the display panel is turned on during at least a part of the determined light emission period of the display frame whereas the same row of pixels is turned off during the non-light emission period of the display frame. The under-display camera performs sensing at one or more of its rows of sensors during the non-light emission period of the row of pixels. The one or more rows of the sensors spatially corresponds to the row of pixels.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to coordinating operations of an under-display camera and a portion of a display panel over the camera to reduce impact of light emitted from the display panel in sensing operations of the under-display camera. Depending on the level of light in the surrounding of an electronic device, the light emission period of the display panel and the light sensing period of the under-display camera are adjusted. The timing of the light emission period and the light sensing period are controlled so that a row of pixels in the display panel is not in the light emission period when spatially corresponding row or rows of sensors in the under-display camera are in the light sensing period. In this way, the under-display camera may capture images without the influence of light emitted from the display panel while continuing to operate the display panel even when the under-display camera is active.

Figure 1:
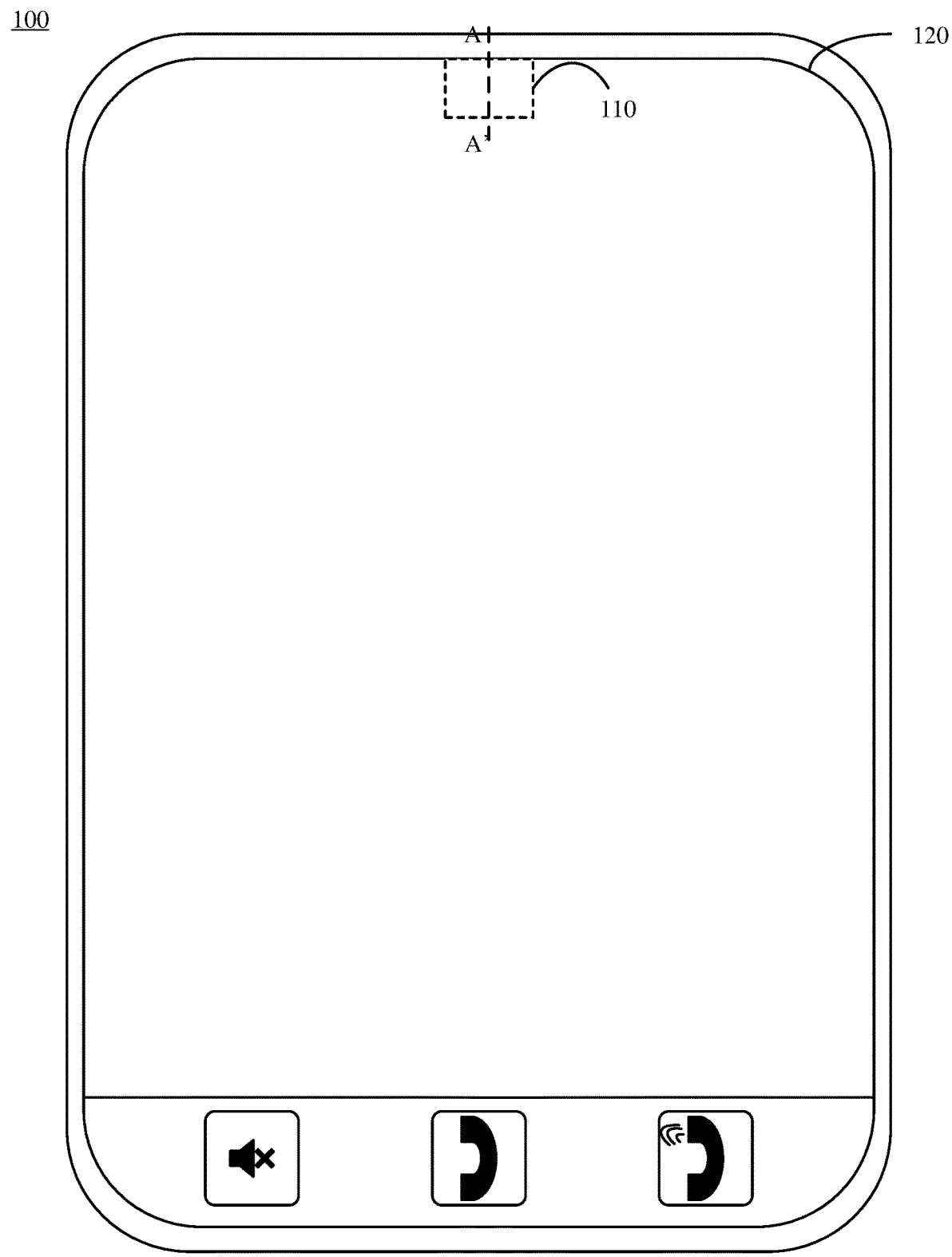
FIG. 1 is a diagram of an electronic device including an under-display camera, according to some embodiments.

FIG. 1 is a diagram of an electronic device 100, in accordance with some embodiments. The electronic device 100 may include, among other components, a display panel 120 and an under-display camera 110 placed below the display panel 120. The display panel 120 displays images (e.g., user interface elements) and detects user inputs (e.g., touch sensing). The electronic device 100 may include further components such as switches, ports and additional cameras (not shown). Explanation of these further components is omitted herein for the sake of brevity.

The electronic device 100 may be embodied as various devices capable of presenting information to its users and capturing images. The electronic device 100 may be, for example, a smartphone, a personal digital assistant (PDA), a smartwatch, a portable gaming console, a laptop computer, a desktop computer or a head-mount display (HMD).

Figure 2:
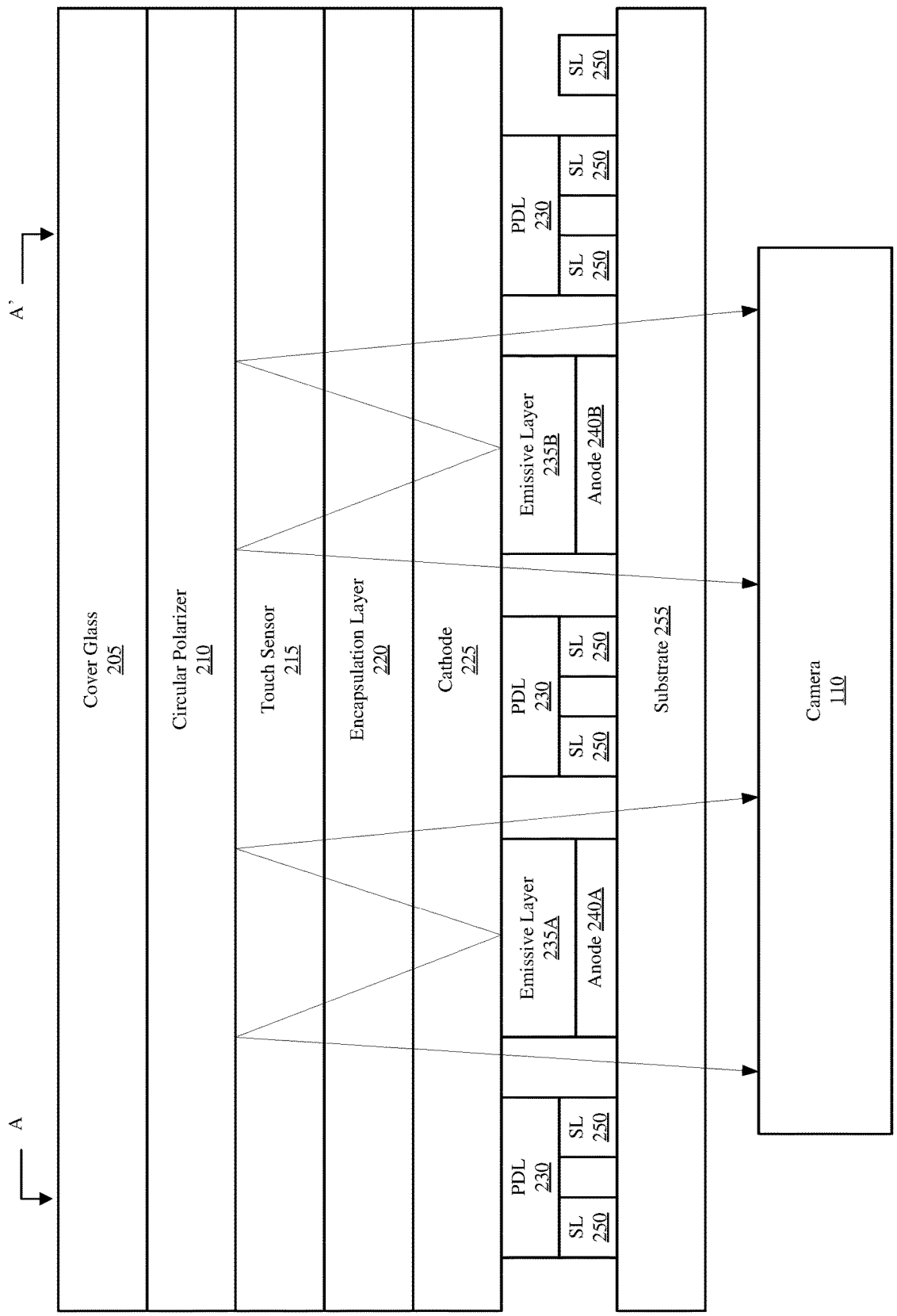
FIG. 2 is a cross-sectional view of the electronic device taken along line A-A' of FIG. 1, according to some embodiments.

FIG. 2 is a cross-sectional view of the electronic device 100 taken along line A-A' of FIG. 1, according to some embodiments. The electronic device 100 includes the under-display camera 110 placed below a portion of the display panel 120. The display panel 120 may be embodied as an organic light-emitting diode (OLED) display or other types of display panels that do not use a backlight. In one or more embodiments, the portion of the display panel 120 above the under-display camera 110 has transparent portions that allows external light to pass through onto the under-display camera 110.

As described herein, the portion of the display panel 120 above the under-display camera 110 refers to a part or section of the display panel 120 having pixels that emit light to impact the sensing operation at the under-display camera 110 when the light is emitted while the under-display camera 110 performs its sensing operations. The portion of the display panel 120 may have the same dimension as an aperture of the under-display camera 110 or have a size slightly larger than the aperture of the under-display camera 110.

In one or more embodiments, the remaining portions of the display panel 120 may lack such transparent portions to prevent structures under the display panel 120 from being visible to the user. The portion of the display panel 120 and the remaining portions of the display panel 120 may be operated differently. For example, the portion of the display panel above the under-display camera 110 may operate at different refresh rate or operate with different timing relative to the remaining portions of the display panel. For this purpose, the display panel above the under-display camera 110 may have signal lines (e.g., gate lines or data lines) separate from the remaining portions of the display panel 120.

In the example of FIG. 2, the display panel 120 is an OLED display panel that includes a cover glass 205, a circular polarizer 210, a touch sensor layer 215, an encapsulation layer 220, a cathode 225, a substrate 255, emissive layers 235A, 235B, anodes 240A, 240B, signal lines 250, and a pixel defining layer (PDL) 230. These components of the display panel 120 are well known in the art, and hence, detailed description thereof is omitted herein for the sake of brevity.

The display panel 120 can be driven with a passive-matrix (PMOLED) or active-matrix (AMOLED) control scheme. In a PMOLED scheme, each row (and line) in the display may be controlled sequentially, whereas AMOLED control typically uses a thin-film transistor to directly access and switch each individual pixel on or off, which allows for higher resolution and larger display areas. The structure of the display panel 120 as illustrated in FIG. 2 is merely illustrative, and display panels with various other structures may be used with embodiments described herein.

In some embodiments, the display panel 120 may include a micro-OLED. A "micro-OLED," in accordance with various examples, may refer to a particular type of OLED having a small active light emitting area (e.g., less than 2,000 µm2 in some embodiments, less than 20 µm2 or less than 10 µm2 in other embodiments). In some embodiments, the emissive surface of the micro-OLED may have a diameter of less than approximately 2 µm. Such a micro-OLED may also have collimated light output, which may increase the brightness level of light emitted from the small active light emitting area.

The substrate 255 is transparent and external light passes into camera 110 through portions of the substrate 255 where signal lines 250 or anodes 240A, 240B are not deposited. As shown in FIG. 2, when the display panel 120 is turned on, part of the light emitted from emission layer 235A, 235 is reflected back from one or more of the upper layers (e.g., circular polarizer 210) into the under-display camera 110, as indicated by arrows.

Hence, in a conventional operating scheme, the portion or section of the display panel 120 above the under-display camera 110 is turned off during the entire time when the under-display camera 110 is active. Turning off the portion or section of the display panel 120 creates a blank region or notch in the screen where the image is not displayed during the activation of the under-display camera 110. Embodiments avoid turning off the portion or section of the display panel 120 by keeping the entire display panel 120 active while performing the sensing operation of the under-display camera 110 during non-light emitting periods of the portion of the display panel 120 above the under-display camera 110.

Figure 3:
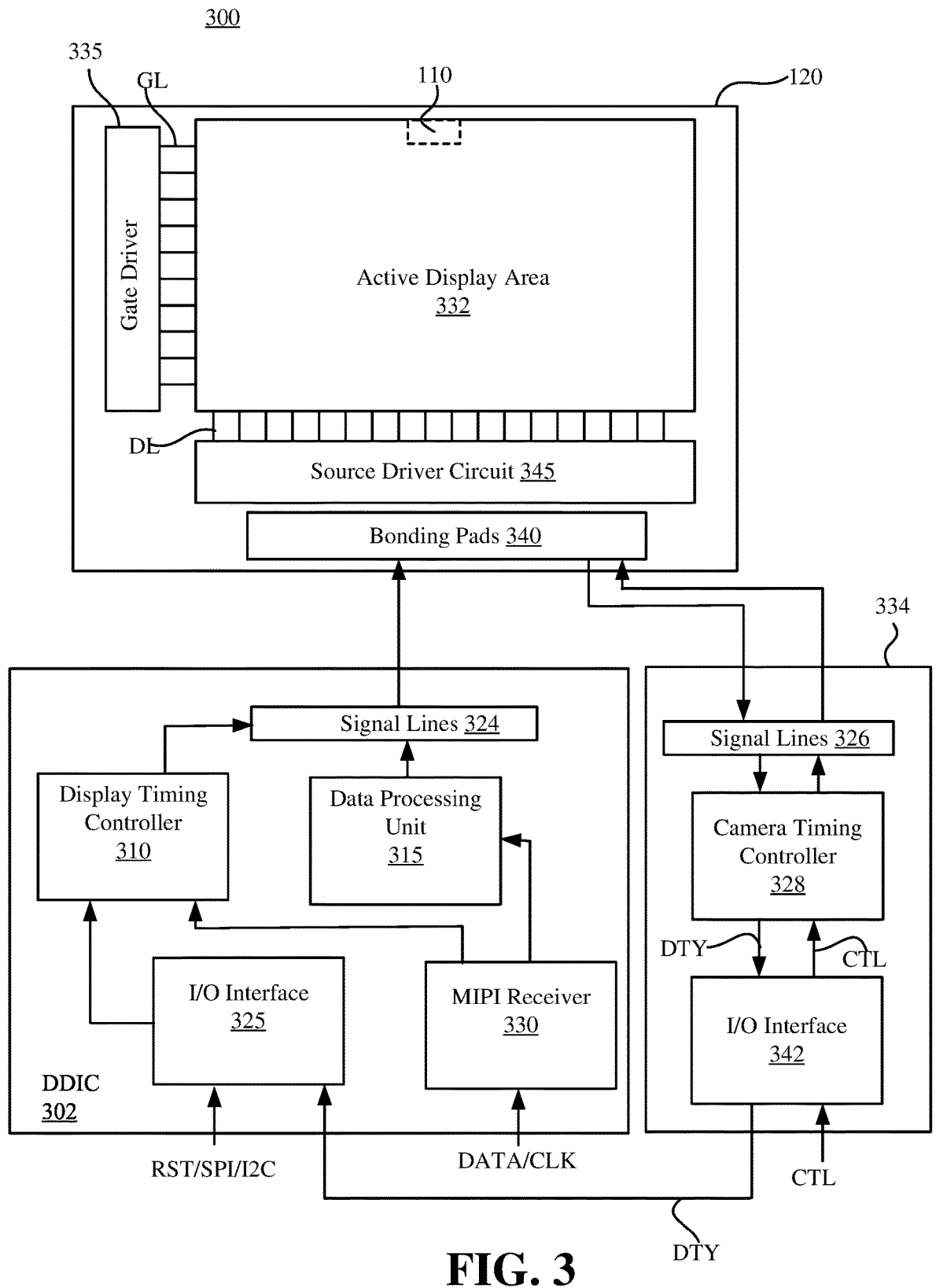
FIG. 3 is a block diagram illustrating a display device with the under-display camera and their operating circuits, according to some embodiments.

FIG. 3 is a block diagram illustrating a display device 300 with the under-display camera 110 and their operating circuits 310, 334, according to some embodiments. The display device 300 includes the display panel 120 and display driver integrated circuit (DDIC) 302. The display panel 120 may be coupled directly or indirectly to the DDIC 302 and camera control circuit 334. The DDIC 302 and the camera control circuit 334 may include circuits formed using, for example, conventional CMOS processing.

The display panel 120 may include various operating circuits and bonding pads 340 in addition to the active display area 332 for displaying images. The operating circuits include gate driver 335 and source driver circuit 345. The bonding pads 340 are conductive regions in the display panel 120 that are electrically coupled to the signal lines 324 of the DDIC 302 to receive timing control signals from the display timing controller 310, data signals from the data processing unit 315. The bonding pads 340 are also electrically coupled to the signal lines 326 of the camera control circuit 334 to send a brightness signal DTY or receive signals for operating the under-display camera 110. Although FIG. 3 illustrates an embodiment where the DDIC 302 generates data signals and timing control signals and transmits the signals to the bonding pads 340, in other embodiments, the display timing controller 310 and/or the data processing unit 315 may be in the display panel 120 instead of the DDIC 302.

The gate driver 335 may be connected to a plurality of gate lines GL and provide gate-on signals to the plurality of gate lines at appropriate times. In some embodiments, each subpixel in the display panel 120 may be connected to a gate line. For a given subpixel, when the subpixel receives a gate-on signal via the corresponding gate line, the subpixel can receive a data signal to emit light.

The source driver circuit 345 may receive data signals from the data processing unit 315 and provide the data signals to the active display area 332 via data lines DL. The source driver circuit 345 may include multiple source drivers, each of which is connected to columns of pixels via a subset of data lines DL.

The DDIC 302 is a circuit that controls the operation of the display panel 120. The DDIC 302 may include a display timing controller 310, a data processing unit 315, an input/output (I/O) interface 325, a mobile industry processor interface (MIPI) receiver 330, and signal lines 324. In other embodiments, one or more components of the DDIC 302 may be disposed in the display panel 120.

The display timing controller 310 is a circuit that generates timing control signals for the gate driver 335, the source drivers 345, and other components in the display panel 120. The timing control signals may include a clock, a vertical synchronization signal, a horizontal synchronization signal, and a start pulse. However, timing control signals provided from the display timing controller 310 according to embodiments of the present disclosure are not limited thereto.

The data processing unit 315 is a circuit that receives image data DATA from the MIPI receiver 330 and convert the data format of the image data DATA to generate data signals input to the source drivers 345 for displaying images in the active display area 332.

The I/O interface 325 is a circuit that receives control signals from other sources and sends operation signals to the display timing controller 310. The control signals may include a reset signal RST to reset the display panel 120 and signals according to serial peripheral interface (SPI) or inter-integrated circuit (I2C) protocols for digital data transfer. Based on the received control signals, the I/O interface 325 may process commands from a system on a chip (SoC), a central processing unit (CPU), or other system control chip. Further, display timing controller 310 further determines a light emission period during which rows of pixels in the active display area 332 may emit light, as described below in detail with reference to FIGS. 4 and 5.

The MIPI receiver 330 may be a MIPI display serial interface (DSI), which may include a high-speed packet-based interface for delivering video data to the pixels in the display active area 332. The MIPI receiver 330 may receive image data DATA and clock signals CLK and provide timing control signals to the display timing controller 310 and image data DATA to the data processing unit 315.

The display active area 332 may include a plurality of pixels (e.g., m rows by n columns) with each pixel including a plurality of subpixels (e.g., a red subpixel, a green subpixel, a blue subpixel). Each row of subpixels may be connected to a gate line and each column of subpixels may be connected to a data line. The subpixels are driven to emit light according to a data signal received through the data lines when gate lines connected to the subpixels provide gate-on signals to the subpixels.

The camera control circuit 334 is a circuit that controls the operation of the under-display camera 110. The cameral control circuit 334 includes signal lines 326, a camera timing controller 328 and an I/O interface 342. The signal lines 326 are physically connected to the bonding pads 340 of the display panel 120 to communicate with the under-display camera 110. The camera timing controller 328 receives brightness signal DTY from the under-display camera 110. Although the camera control circuit 334 and the under-display camera 110 communicate with the bonding pads 340 of the display panel 120 in the example of FIG. 3, the camera control circuit 334 and the under-display camera 110 may have separate wires to directly transmit their signals instead of passing through the bonding pads 340 and traces in the display panel 120.

The brightness signal DTY indicates the level of light in the environment of the electronic device 100, as detected by the under-display camera 110. The brightness signal DTY may be an average or median value of luminance values detected at multiple sensors in the under-display camera 110 or a value detected at a representative sensor in the under-display camera 110. The camera timing controller 328 may determine a light sensing period of a sensing frame according to the brightness signal, as described below in detail with reference to FIGS. 4 and 5. The brightness signal DTY may be sent from the camera control circuit 334 to DDIC 302 via the I/O interface 342. In alternative embodiments, the brightness signal DTY may be sent directly from the under-display camera 110 via bonding pads 340 and signal lines 324 to the display timing controller 310 instead of receiving the same signal via the camera timing controller 328. In other embodiments, the brightness signal DTY may be sensed by a sensor separate from the under-display camera 110.

The I/O interface 342 of the camera control circuit 334 is a circuit that enables the camera control circuit 334 to communicate with other components of the electronic device 100. For example, the I/O interface 342 sends the brightness signal DTY to the DDIC 302 and receives a control signal CTL from a CPU to operate the under-display camera 110. The control signal CTL may instruct turning on/off of the under-display camera 110 as well as control the operating parameters such as exposure time and modes of the under-display camera 110 (e.g., still picture mode or a movie mode).

Figure 4:
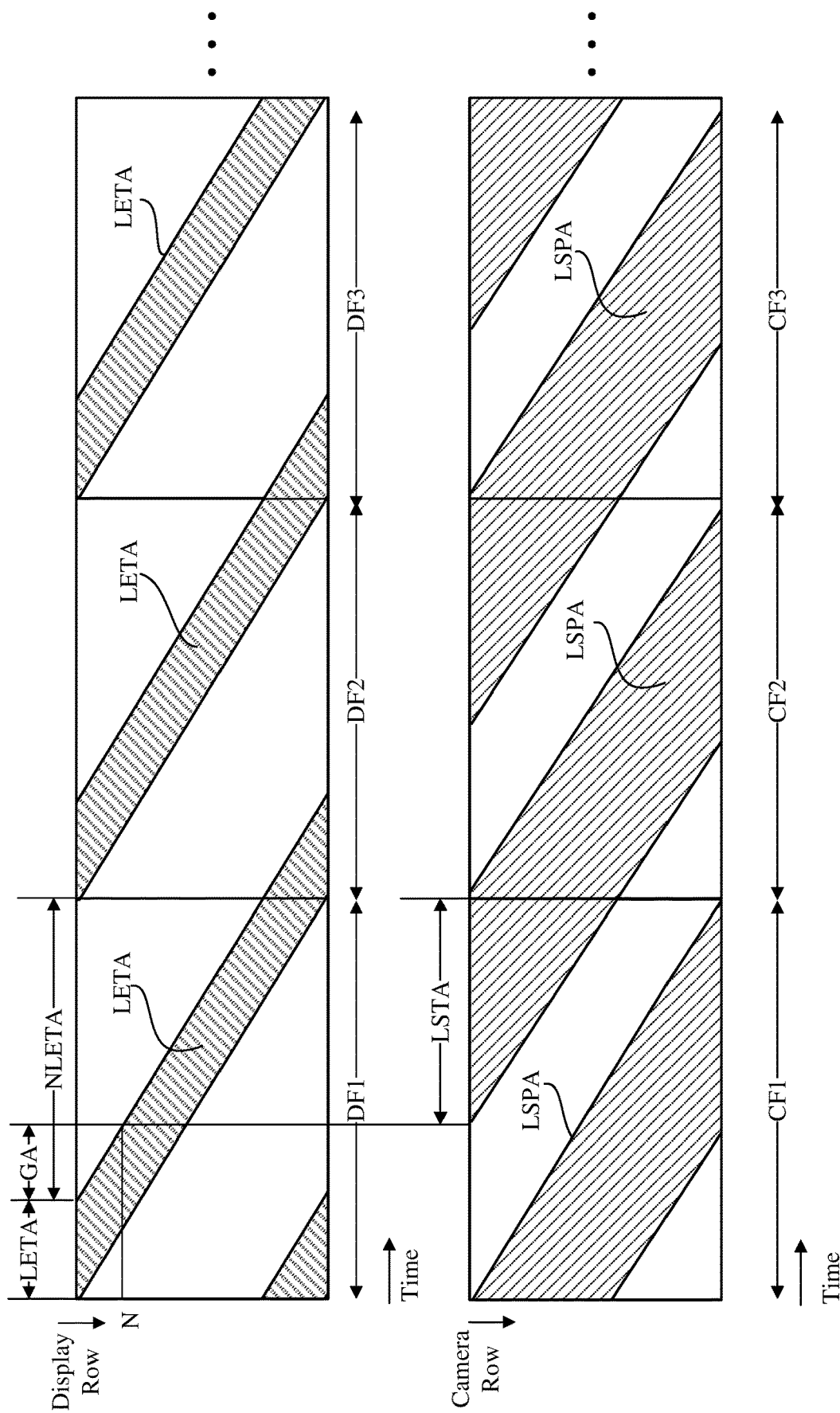
FIG. 4 is a timing diagram illustrating operation of a portion of the display panel and the under-display camera under low lighting conditions, according to some embodiments.
Figure 5:
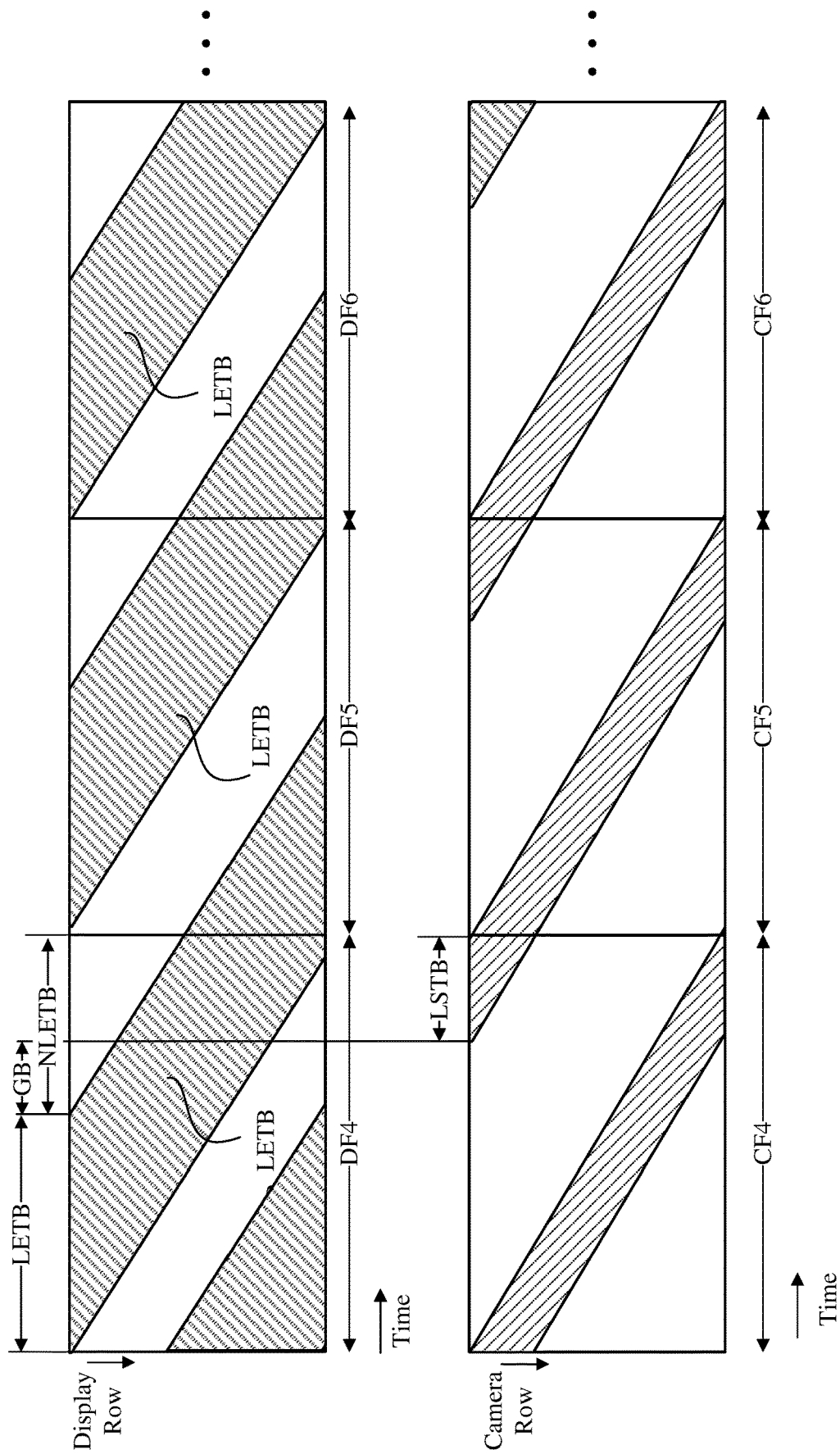
FIG. 5 is a timing diagram illustrating operation of the portion of the display panel and the under-display camera under bright lighting conditions, according to some embodiments.

FIGS. 4 and 5 are timing diagrams illustrating the operation of the under-display camera 110 and the portion of the display panel 120 above it under different lighting conditions, according to some embodiments. The under-display camera 110 and the portion of the display panel 120 operate according to sensing frames CF1 through CF6 and display frames DF1 through DF6, respectively. In the embodiment, the length of each sensing frame and the length of each display frame are assumed to be identical (e.g., 60 Hz). Further, each sensing frame and a corresponding display frame is assumed to start at the same time and end at the same time. However, in alternative embodiments, the display frames may be shifted in terms of time relative to corresponding sensing frames.

When the electronic device 100 is placed in a low light condition, the under-display camera 110 detects and generates a brightness signal DTY indicating as such. In response, the camera timing controller 328 sets a longer light sensing period LSTA as shown in FIG. 4 because sensors in camera are to be exposed to the light for a longer time to account for lower intensity light. Conversely, the display timing controller 310 sets a shorter light emission period LETA because the user can view dimmer images displayed by the display panel 120 in a low lighting condition.

A row of pixels in the display panel 120 and one or more spatially corresponding rows of sensors in the camera 110 are shifted in terms of time so that the sensing period of the rows of sensors do not overlap with the light emission period of the row of pixels. A row of pixels that spatially corresponds to a row of sensors refers to the row of pixels that overlap or are closely located to the row of sensors so that the light emitted from the row of pixels would impact the sensing operation of the row of sensors if the row of sensors captures light at the same time when the row of pixels emit light. Because of the smaller size of the sensors and optical characteristics of lens in the under-display camera 110, multiple rows of sensors may spatially correspond to a single row of pixels in the display panel 120.

Assuming that the under-display camera 110 operates with a rolling shutter, each subsequent row of the sensors in the camera 110 undergoes the light sensing period LSTA at a time shifted (e.g., at a later time) relative to a preview row. Similarly, because the display panel 120 operates in a rasterized manner, a subsequent row of pixels in the display panel 120 undergoes the light emission period LETA at a time shifted (e.g., at a later time) relative to the previous row of pixels. Hence, a row of the sensors in the camera 110 may be controlled to capture light when a spatially corresponding row of pixels in the display panel 120 is in a non-light emitting period NLETA. Assuming, for the sake of explanation, that each row of pixels in the display panel 120 spatially corresponds to each row of sensors in the camera 110, light interference from the display panel 120 may be avoided by placing each row of sensors in a light sensing period LSTA while a spatially corresponding row of pixels is in a non-light emitting period NLETA, and placing a next row of sensors in the light sensing period LSTA with a subsequent row of pixels in the non-light emitting period NLTA.

The light emission period described herein refers to the time during which a row of pixels may emit light in a display frame. Not all pixels in the row are to emit light for the entire light emission period. Rather, it is typical that at least a subset of pixels would emit light for only a part of the light emission period. If the pixel represents a dark portion of an image, for example, the pixel may remain turned off during the entire light emission period or turn on for a fraction of the light emission period. Further, if a pulse-width modulation scheme or its modified version is used to operate the pixels, the turn-on time of the pixels may be a fraction of the light emission period. That is, the light emission period defines a maximum amount of time that a pixel may be turned on, not the actual time that the pixel is turned on. The non-light emitting period refers to the time in the display frame other than the light emission period.

Similarly, the light sensing period described herein refers to the maximum amount of time during which a row of sensors in a camera may capture light. Depending on the mode of camera or other operating parameters, the row of sensors may sense light for only a fraction of the light sensing period.

Taking an example of the top row of the pixels and the top row of sensors of FIG. 4, a first display frame DF1 starts with the light emission period LETA for the top row of pixels. After the light emission period LETA of the top row of pixels is finished, a non-light emission period NLETA for the top row of pixels starts. After the starting of the non-light emission period NLETA for the top row of pixels and passage of time defined by a gap period GA, a light sensing period LSTA for the top row of the sensors in the camera 110 is initiated. Hence, the light sensing of the top row of the sensors does not start until the light emission period LETA for the top row of pixels and the gap period GA expires.

The gap period GA is set to provide sufficient headroom so that the row of sensors do not start its sensing operation until subsequent rows of pixels in the display panel 120 that may impact the sensing operation are turned off. That is, the gap period GA ensures that the light emission period of Nth pixel row of the display panel 120 is terminated before the light sensing period LSTA of the top row of the sensors start, and therefore, the light emitted from the top rows of pixels through Nth row of pixels do not interfere with the sensing operation of the top row of sensors in the camera 110. The gap period GA may be determined by the camera timing controller 328 to ensure that subsequent rows of pixels in the display panel 120 that do not spatially correspond to a row of the sensors in the camera 110. In one or more embodiments, the gap period GA may be omitted (e.g., GA=0).

The under-display camera 110 operates according to sensing frames. Taking the example of FIG. 4, the light sensing period LSTA for the top row of the sensors does not start until the light emission time LETA for Nth row of pixels in the display panel 120 is finished.

As time progresses, the sensing operation is performed for subsequent rows of pixels in a rolling manner according to the control of the camera control circuit 334. As shown in the FIG. 4, the sensing operation for a row of sensors may span across two sensing frames (e.g., CF1 and CF2).

A subsequent sensing frame (e.g., CF2 or CF3) starts with the top row of the sensors being turned off, and starting the sensing operation of the top row after the light emission time LETA and the gap period GA in the subsequent sensing frame LETA expires.

As shown in FIG. 4, the length of the light emission period LETA and the length of the light sensing period LSTA may remain consistent across multiple display frame DF1 through DF3 and the sensing frames CF1 through CF3. Alternatively, the light emission period and/or the light sensing period may change dynamically per a display frame or a sensing frame.

When the lighting conditions become brighter, the camera 110 generates an updated brightness signal DTY indicating a higher level of light in the environment. The camera timing controller 328 receives the updated brightness signal DTY and decreases the duration of the light sensing period (e.g., LSTB as shown in FIG. 5) because the sensors in the camera can now capture more light in a shorter amount of exposure time. The updated brightness signal DTY may also be sent to the display timing controller 310 so that the display timing controller 310 increases the light emission time period (e.g., LETB as shown in FIG. 5) so that the images are presented to the user at a higher luminance to account for the brighter environment. In this way, the display panel 120 can operate with increased brightness while the camera 110 continues to perform its sensing operations without impact from the light emitted from the display panel 120.

Specifically, as the environment becomes brighter, the light emission period LETB in FIG. 5 becomes longer than when the environment was darker (e.g., low lighting conditions in FIG. 4) while the light sensing period LSTB becomes shorter than the light sensing period LSTA of FIG. 4. Taking the example of display frame DF4, the top row of the pixels in the display panel 120 may emit light for the duration of extended light emission period LETB, and then enter the non-light emission period NLETB which is shorter than the non-light emission period NLETA of FIG. 5. The light emission period for subsequent rows of pixels is shifted in time (e.g. appears later in time) relative to the light emission period for the top row of pixels.

In sensing frame CF4, the top row of sensors in the camera 110 does not start its sensing operation until the extended light emission period LETB and the gap period GB expires. Then sensing operation of the top row lasts for a light sensing period LSTB that is shorter than the light sensing period LSTA of FIG. 4. The gap period GB may be the same as the gap period GA of FIG. A or it may be different than the gap period GA. In one embodiment, the gap period GB is increased relative to the gap period GA to account for increased brightness of display pixels and accompanying increase in the possibility of pixel light impacting rows of pixels further away from the operating row of sensors.

As shown in FIG. 5, the duration of the updated light emission period LETB and the updated light sensing period LSTB may be maintained across multiple display frames DF4 through DF6 and multiple sensing frames CF4 through CF6.

By adjusting the light emission period of the display panel 120 and the light sensing period of the camera 110, embodiments enable the display operation of the portion of the display panel 120 above the camera 110 to continue regardless of the operation of the camera 110. That is, the portion of the display panel 120 above the camera 110 may continue to emit light and display images even when the camera 110 is capturing external images. Therefore, the user does not notice a notch or a blacked-out region of the display panel 120 even when the camera 110 is operated.

In one or more embodiments, the operational scheme described above with reference to FIGS. 4 and 5 may apply only to pixels in a portion of the display panel 120 immediately above the under-display camera 110, and not the entire pixels of camera 110. Only light emitted from the portion of the display panel 120 immediately above the under-display camera 110 impacts the sensing operation of the under-display camera 110 whereas light emitted from remaining portions of the display panel 120 may have no impact or have only negligible impact on the sensing performance of the under-display camera 110. Accordingly, only the portion of the display panel 120 immediately above the under-display camera 110 may operate according to the scheme as described above with reference to FIGS. 4 and 5 while the remaining portions of the display panel 120 operates independent of the operations of the under-display camera 110.

Further, the patterns of light emitting periods and the light sensing periods may be of different from what are described with reference to FIGS. 4 and 5. For example, blocks representing the light emission periods and the light sensing periods may have of shapes other than parallelograms. That is, blocks representing the light emission periods and the light sensing periods may include two or more subblocks of parallelograms shorted apart in terms or time or of zig-zagged shape. As long as the blocks the light emission periods and the block representing the light sensing periods do not overlap, the light emission periods and the light sensing periods may have various different configurations.

Figure 6:
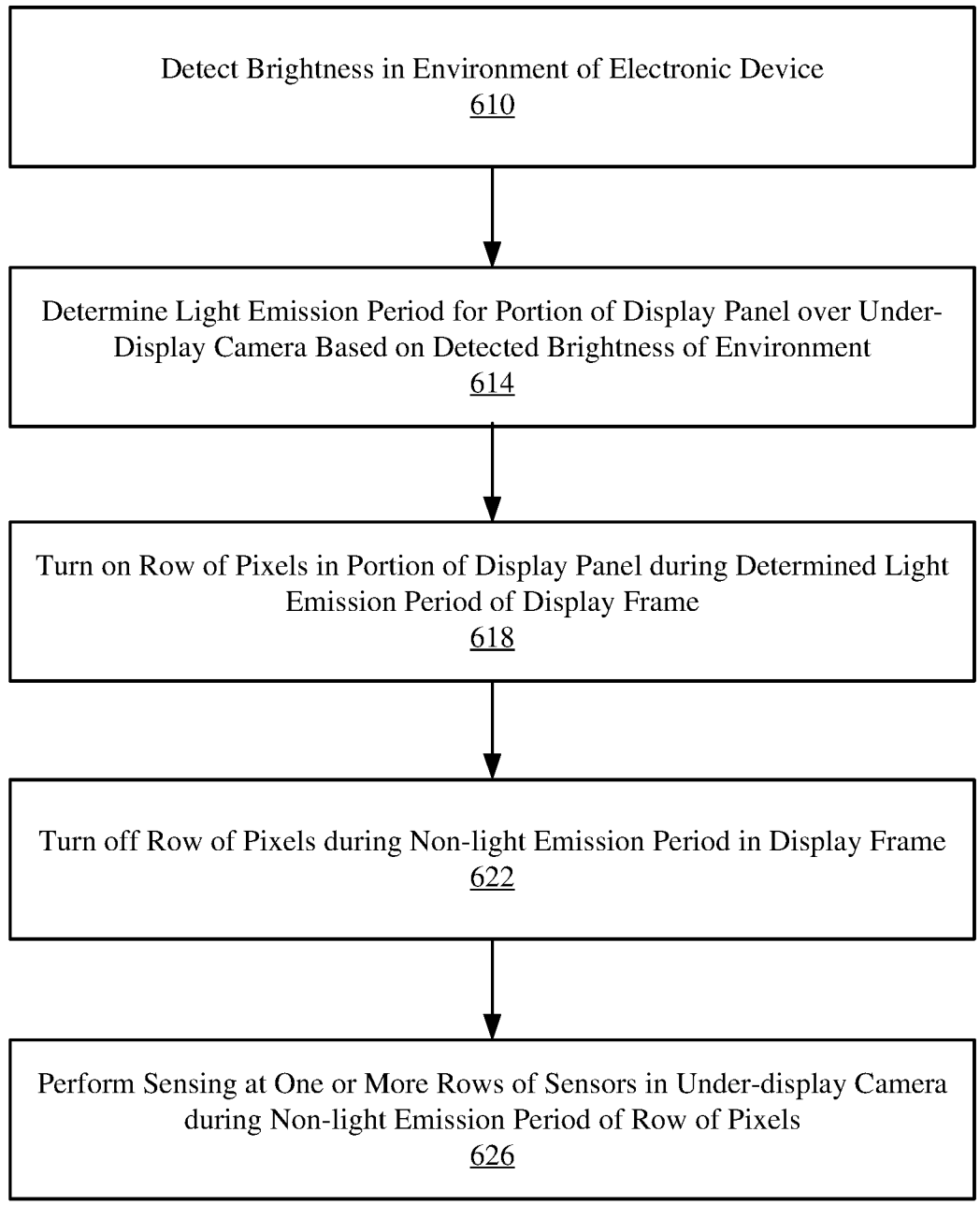
FIG. 6 is a flowchart illustrating an operation of the under-display camera and the display panel, according to some embodiments.

FIG. 6 is a flowchart illustrating an operation of the under-display camera 110 and the display panel 120, according to some embodiments. Brightness in the environment of the electronic device 100 is detected 610. The brightness may be detected by the under-display camera 110 or a separate light sensor. The detected brightness is represented by brightness signal DTY that is sent to the camera control circuit 334 and the DDIC 302.

Based on the brightness signal DTY, a light emission period for a portion of display panel 120 over the under-display camera 110 is determined 614. The light emission period is increased when the brightness signal DTY indicates brighter lighting conditions whereas the light emission period is decreased when the bright signal DTY indicates low lighting conditions.

A row of pixels in the portion of the display panel 120 above the under-display camera 110 is turned on 618 during the light emission period of a display frame. During the light emission period, one or more rows of sensors in the camera 110 spatially corresponding to the row of pixels do not capture light.

During the non-light emission period, the row of pixels in the portion of the display panel above the under-display camera 110 is turned off 622 and does not emit light. During the non-light emission period of the display frame, one or more rows of sensors in the camera 110 spatially corresponding to the row of pixels performs 626 are operated to sense light.

The steps and the sequence of steps in FIG. 6 are merely illustrative and other steps and sequence may be used instead. For example, the turning off the row of pixels may be performed in parallel with performing sensing at one or more rows of sensors spatially corresponding to the row of pixels.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method of operating an under-display camera of an electronic device, comprising:

turning on a first row of pixels in a first portion of a display panel during at least a part of a first light emission period of a display frame;
turning off the first row of pixels during a first non-light emission period in the display frame;
performing sensing at a first row of sensors in the under-display camera during a first light sensing period that overlaps with the first non-light emission period of the first row of pixels, the first row of sensors overlapping with the first row of pixels;
turning on a second row of pixels in a second portion of the display panel during at least a part of a second light emission period of the display frame;
turning off the second row of pixels during a second non-light emission period in the display frame; and
performing sensing at a second row of sensors in the under-display camera during a second light sensing period that overlaps with the second non-light emission period of the second row of pixels, the second row of sensors overlapping with the second row of pixels.

2. The method of claim 1, further comprising disabling sensing at the first row or the second row of the sensors during the light emission period of the respective first or second row of pixels.

3. The method of claim 2, wherein a sensing frame of the under-display camera coincides with the display frame.

4. The method of claim 1, further comprising detecting brightness in environment of the electronic device, and wherein the first or second light emission period is increased responsive to an increase of the brightness in the environment, and the first or second light emission period is decreased responsive to a decrease in the brightness in the environment.

5. The method of claim 4, wherein the first or second light sensing period of the first or second row of the sensors is decreased responsive to the increase of the brightness of the environment, and the first or second light sensing period is increased responsive to the decrease in the brightness in the environment.

6. The method of claim 5, wherein the first or second light sensing period and the respective first or second light emission period do not overlap.

7. The method of claim 6, wherein the first or second light sensing period and the respective first or second light emission period are separated by a gap period.

8. The method of claim 5, wherein the second light emission period is shifted in time relative to the first light emission period, and the second light sensing period is shifted in time relative to the first light sensing period.

9. The method of claim 4, wherein the brightness is sensed by the under-display camera.

10. An electronic device, comprising:
a display panel;
an under-display camera below the display panel;
a first control circuit coupled to the display panel, the first control circuit configured to:
turn on a first row of pixels in a first portion of a display panel during at least a part of a first light emission period of a display frame,
turn off the first row of pixels during a first non-light emission period in the display frame;
turn on a second row of pixels in a second portion of the display panel during at least a part of a second light emission period of the display frame; and
turn off the second row of pixels during a second non-light emission period in the display frame; and a second control circuit coupled to the first control circuit and the under-display camera, the second control circuit configured to:

instruct a first row of sensors in the under-display camera to perform sensing during a first light sensing period that overlaps with the first non-light emission period of the first row of pixels, the first row of sensors overlapping with the first row of pixels;

instruct a second row of sensors in the under-display camera to perform sensing during a second light sensing period that overlaps with the second non-light emission period of the second row of pixels, the second row of sensors overlapping with the second row of pixels.

11. The electronic device of claim 10, wherein the first control circuit is further configured to disable sensing at the first or second row of the sensors during the respective first or second light emission period of the row of pixels.

12. The electronic device of claim 11, wherein a sensing frame of the under-display camera coincides with the display frame.

13. The electronic device of claim 10, wherein the first control circuit is configured to increase the first or second light emission period responsive to an increase of brightness in environment of the electronic device, and decrease the first or second light emission period responsive to a decrease in the brightness in the environment.

14. The electronic device of claim 13, wherein the second control circuit is configured to decrease the first or second light sensing period of the first or second row of the sensors responsive to the increase of the brightness of the environment, and increase the first or second light sensing period responsive to the decrease in the brightness in the environment.

15. The electronic device of claim 14, wherein the first or second light sensing period and the respective first or second light emission period do not overlap.

16. The electronic device of claim 15, wherein the first or second light sensing period and the respective first or second light emission period are separated by a gap period.

17. The electronic device of claim 14, wherein the second light emission period is shifted in time relative to the first light emission period, and the second light sensing period is shifted in time relative to the first light sensing period.

18. The electronic device of claim 13, wherein the under-display camera is configured to sense the brightness, and send a signal indicative of the brightness to the second control circuit.

19. The electronic device of claim 18, wherein the second control circuit is further configured to send the signal to the first control circuit for updating the light emission period.

20. A non-transitory computer-readable storage medium storing instructions thereon, the instructions when executed cause a processor to:

turn on a first row of pixels in a first portion of a display panel over an under-display camera during at least a part of a first light emission period of a display frame;

turn off the first row of pixels during a first non-light emission period in the display frame;

perform sensing at a first row of sensors in the under-display camera during the first non-light emission period of the first row of pixels, the first row of sensors overlapping with the first row of pixels;

turn on a second row of pixels in a second portion of the display panel during at least a part of a second light emission period of the display frame;

turn off the second row of pixels during a second non-light emission period in the display frame; and perform sensing at a second row of sensors in the under-display camera during the second non-light emission period of the second row of pixels, the second row of sensors overlapping with the second row of pixels.

* * * * *